(12) United States Patent
Guliana

(10) Patent No.: US 6,325,203 B1
(45) Date of Patent: Dec. 4, 2001

(54) METHOD AND APPARATUS FOR RAPIDLY PROCESSING MACHINE TOOL CHIPS

(75) Inventor: John Guliana, Skokie, IL (US)

(73) Assignee: A. Finkl & Sons Co., Chicago, IL (US)

( * ) Notice: Subject to any disclaimer, the term of this patent is extended or adjusted under 35 U.S.C. 154(b) by 0 days.

(21) Appl. No.: 09/413,502

(22) Filed: Oct. 6, 1999

(51) Int. Cl.⁷ ................................................. B65G 33/00
(52) U.S. Cl. .......................... 198/670; 198/675; 409/131
(58) Field of Search ................................... 209/243, 244, 209/245, 254; 198/657, 670, 671, 675; 409/131, 137, 145

(56) References Cited

U.S. PATENT DOCUMENTS

| | | | | |
|---|---|---|---|---|
| 656,346 | * | 8/1900 | Dietz | 209/245 X |
| 1,118,221 | * | 11/1914 | Pantaze | 209/245 X |
| 1,202,374 | * | 10/1916 | Fraser | 209/245 X |
| 1,313,729 | * | 8/1919 | Parsons | 209/245 X |
| 5,951,219 | * | 9/1999 | Stadtfeld et al. | 409/131 |

FOREIGN PATENT DOCUMENTS

778819 * 11/1980 (SU) ..................................... 209/245

* cited by examiner

*Primary Examiner*—Tuan N. Nguyen
(74) *Attorney, Agent, or Firm*—A. Finkl & Sons Co.

(57) ABSTRACT

A method and apparatus for forming a steady state stream of machine tool chips in a chip takeaway system which includes a hopper having finger-like projections which extend toward the center of the hopper at or above the level of auger means to relieve packing forces on chips beneath the projections, and a clockwise/counter-clockwise, rotate/pause method of auger operation which further reduces the tendency for chips to pack.

4 Claims, 3 Drawing Sheets

METHOD AND APPARATUS FOR RAPIDLY PROCESSING MACHINE TOOL CHIPS

This invention pertains generally to providing a steady state stream of discrete, non-uniformly shaped pieces of scrap materials so as to enable the pieces to be more conveniently and efficiently processed for further use or disposal. More specifically the invention pertains to a method and apparatus for providing a steady state stream of machine tool chips which are generated at intervals, usually irregular in terms of time, from point generation sources, such as lathes, milling machines and similar tools used in industrial machining operations.

BACKGROUND OF THE INVENTION

Literally millions of tons of machine tool chips and similar scrappage is generated each year in industrial machining operations including, primarily, machine shops. A machine tool chip is an irregularly shaped product in the sense that, though it may be a uniform few thousandths of an inch thick and wide, it may be anywhere from a fraction of an inch up to several inches in length, and the contour may be anywhere from straight (in an axial sense) to any twisted shape. Such chips must be rapidly removed from the immediate vicinity of their generation point, such as a lathe or a milling machine in a stand-alone or adjunct machine shop operation, and then conveyed to a collection point at which they may be further processed as by (1) dumping, (2) compacting and then dumping at a disposal site, or (3) assembled, with or without compacting or bundling, for recycling in a downstream industrial process, such as being remelted in a steel mill after leaving the steel mill's machine shop. The variations are nearly endless but common to all installations is the problem of ensuring that the volume of chips is maintained in a flowable condition at all times so that bunching or "hanging up" does not occur. When hanging up does occur the quantity of material moving per unit of time in the takeaway system is reduced or terminated and, worse yet, jamming of the system near the generation locations may force the generation locations, such as a machine tool, to shut down due to an inability to remove the chips. The problem of jamming or hanging up in hoppers which are downstream from the generation location, such as a lathe, is particularly troublesome in connection with machine tool chips since, no matter how regularly formed the chips may be, their sharp edges, projections and recesses inevitably cause them to interlock and agglomerate whenever two chips make contact with one another. The more hoppers in a chip takeaway system, the greater the problem.

SUMMARY OF THE INVENTION

The invention is an apparatus and a method of operating it which accepts machine tool chips at a temporary collecting location, usually a surge or collection hopper, and ensures that no matter how large or how small or how variable in size the chips or bulk material may be, there will be no jamming or hanging up in the hopper, and a steady state stream of chips—which are not agglomerated in bunches too large to be efficiently processed downstream—will continuously leave the hopper. Nearly all machine tool shops have a plurality of machine tools whose generated chips are fed into a hopper, and many machine tool shops have so many machine tools that a system comprising a plurality of hoppers must be employed, each having an associated takeaway conveyor. The present invention is applicable to both types of operation; i.e.: to single hopper or multiple hopper layouts, and to any hopper location within a system, including a hopper fed directly by a machine tool or a hopper fed by one or several upstream hoppers.

BRIEF DESCRIPTION OF THE DRAWINGS

The invention is illustrated more or less diagrammatically in the accompanying drawing in which.

DESCRIPTION OF THE INVENTION

Figure 1:
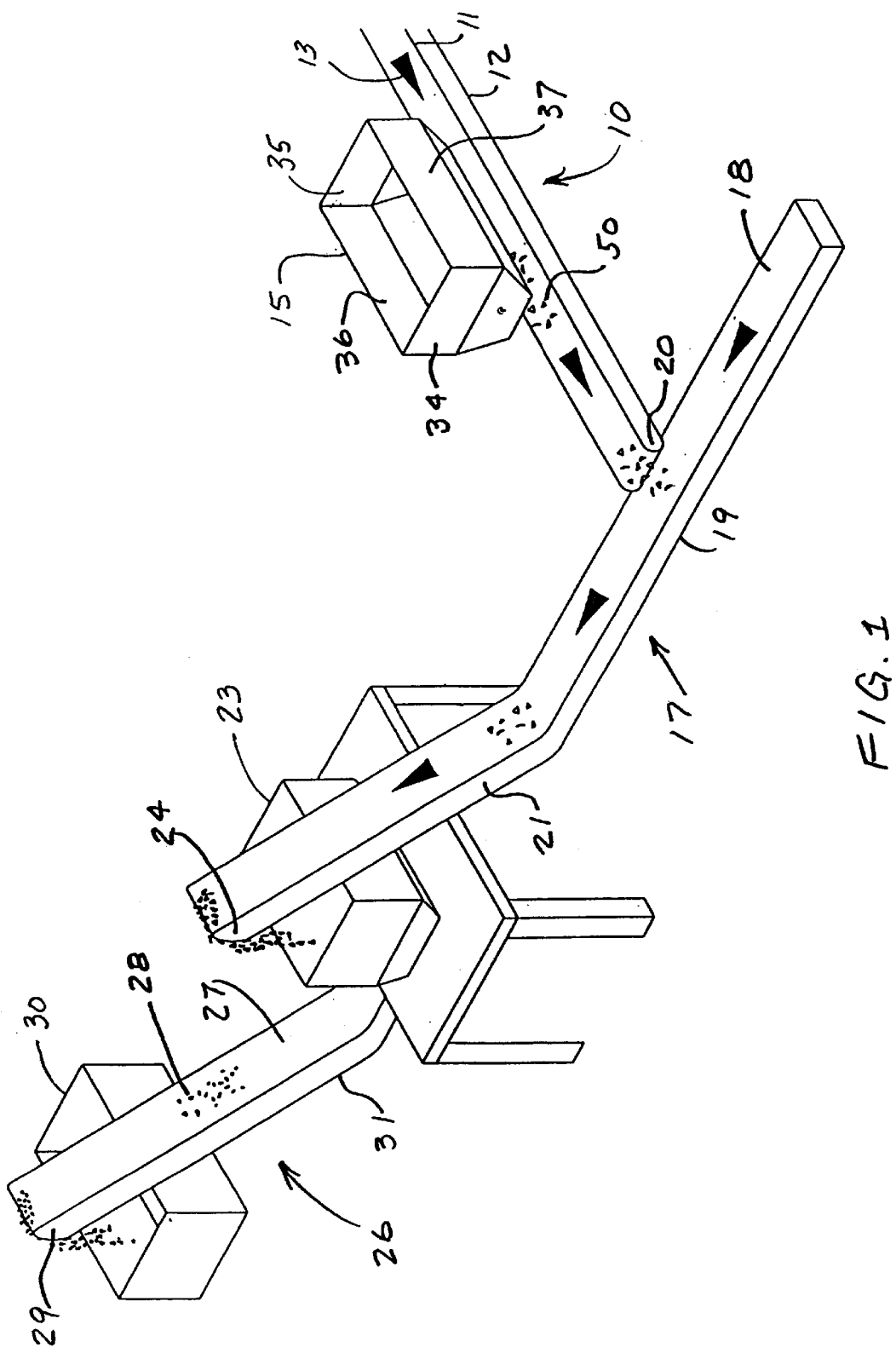
FIG. 1 is a schematic view of the chip processing system as it would be essentially applied to any hopper in a single or plural hopper system.

Like reference numerals will be used to refer to like or similar parts from Figure to Figure in the drawing.

A regulating hopper conveyor is indicated generally at 10 in FIG. 1. The conveyor 10 includes an upper or feed run 11 and a return run 12 with the direction of movement of the feed run being indicated at 13. A collecting zone, here a regulating hopper, is indicated generally at 15, the operation of which will be described hereafter.

The regulating hopper conveyor 10 discharges onto what may broadly be described as a chip processing hopper conveyor indicated generally at 17 which has a feed run 18 and a return run 19. Chip processing hopper conveyor 17 receives chips discharged from the head end 20 of the regulating hopper conveyor 10 and transfers said chips, here, up an incline 21, to a chip processor indicated generally at 23. In this instance the chip processor is a chip crusher having an upwardly open maw, but it will be understood that any suitable processing equipment may be used. In this instance the chips on what may be more conveniently and specifically termed a crusher conveyor 17 are discharged only by gravity over the head end 24 of the crusher conveyor 17.

After processing in the processor 23 the chips are discharged onto a disposal conveyor indicated generally at 26. Conveyor 26 has a feed run 27 which discharges the processed chips 28 over the head end 29 into a takeaway container, here a chip box indicated generally at 30, and a return run indicated at 31.

Figure 2:
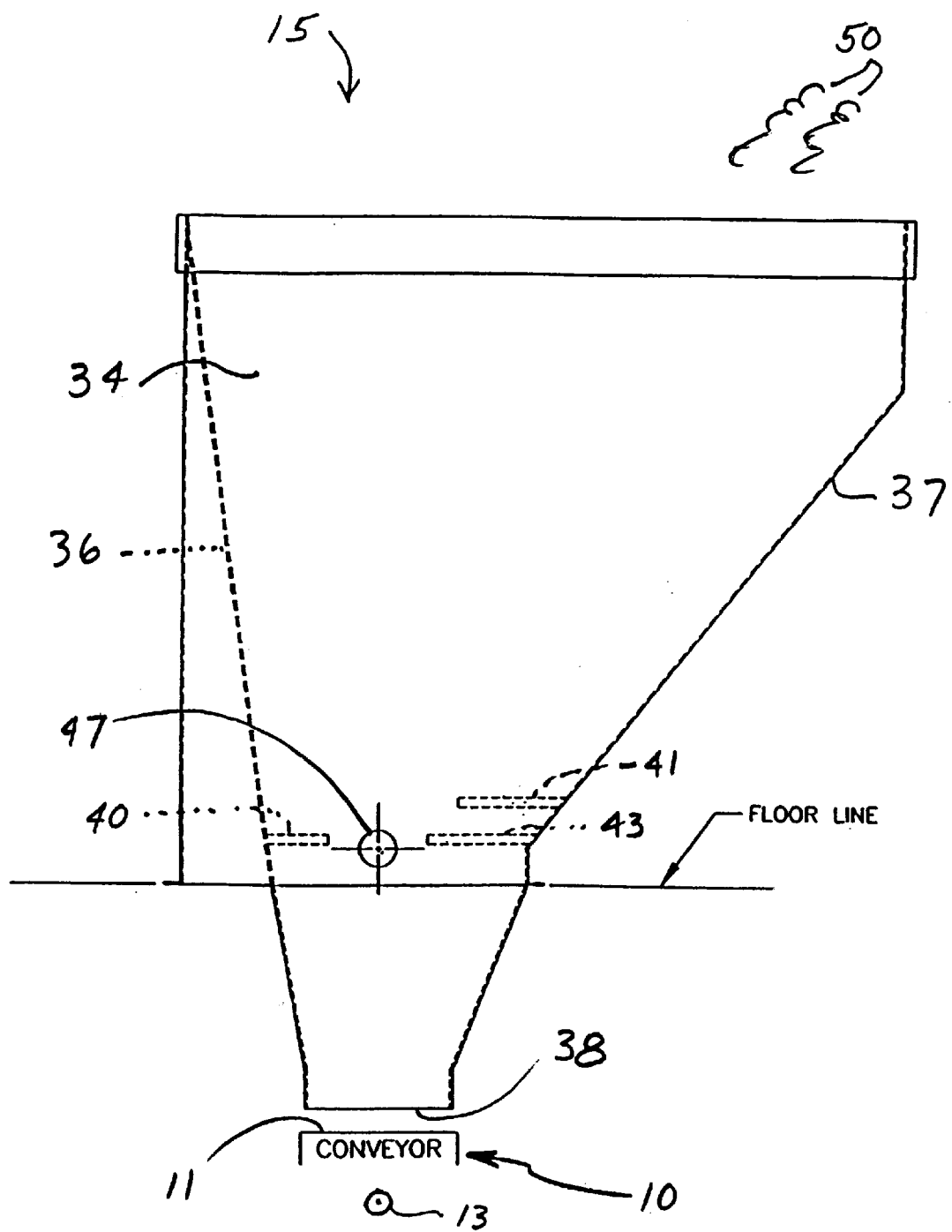
FIG. 2 is an end elevation of the hopper shown in FIG. 1 with parts shown in phantom for ease of understanding.
Figure 3:
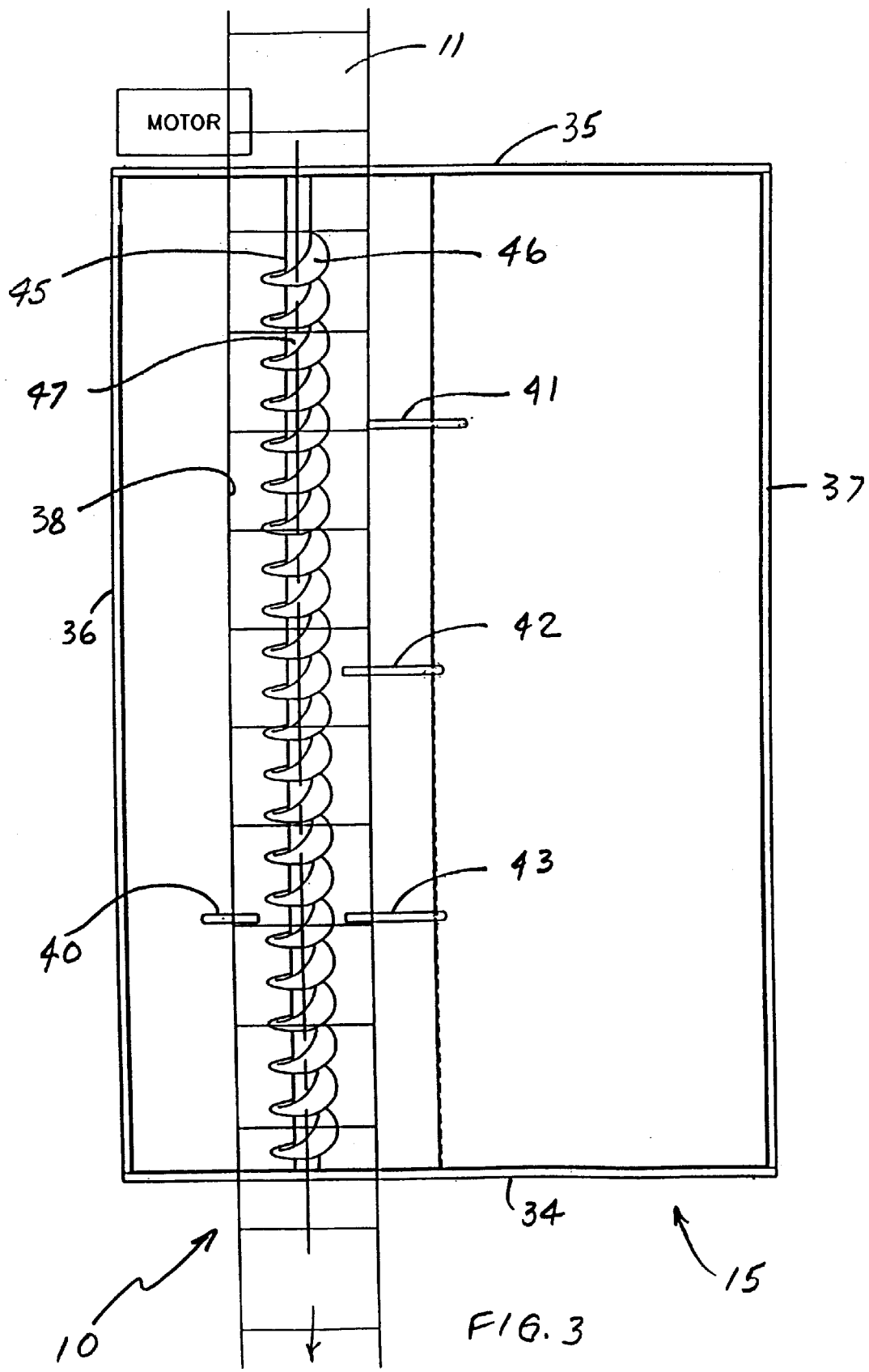
FIG. 3 is a top plan view of the hopper of FIG. 2.

Referring now to FIGS. 2 and 3 it will be seen that the regulating hopper 15 is conventionally constructed having a front wall 34, a rear wall 35, a left side wall 36, and a right side wall 37. As can be best visualized from FIGS. 1 and 2 the front and rear walls 34 and 35 are of a generally inverted trapezoidal shape. Left wall 36 inclines inwardly toward the feed run 11 of conveyor 10 from its upper end to the open bottom of the hopper indicated at 38. In this instance, right wall 37 inclines inwardly toward the feed run 11 of conveyor 10 at a more acute angle than does wall 36, all as best seen in FIG. 2.

A plurality of retaining projections extend from the inside surface of left and right walls 36 and 37 towards the center of the hopper 15. In this instance one projection 40 extends from left wall 36, and three projections, 41, 42, and 43, extend from right wall 37. It will be noted that in this instance projection 41 is at a higher elevation relative to conveyor 10 than projections 42 and 43. The projections may, within rather wide limits, be of a variety of cross-sections. In this instance the projections are simply round bars and this is the preferred shape. A square cross-section could also be utilized. It is preferred however that in any event the upper half of the cross-section be so shaped that machine tool chips can slide downwardly over them without hanging up—as would be the case if upturned angle irons were used. Diameters of about ½ inch have been found to be quite effective.

An auger is indicated generally at 45 which includes a spiral blade 46 and a shaft 47. The auger is powered by a reversing motor 48. From FIG. 3 it will be noted that the auger extends substantially the full length of open bottom 38 and this is the preferred mode. By suitable gearing and timers, the auger 45 rotates alternatively clockwise and counter-clockwise.

The use and operation of the invention is as follows.

When the system is powered, the regulating hopper conveyor 10, crusher conveyor 17 and chip disposal conveyor 26 continuously operate in the direction of the arrows associated with each. Chips, such as lathe chips 50, fall into the open upper end of regulating hopper 15 which can also be described as a collecting or surge hopper. Said chips may have slid down a chute, not shown, whose upper receiving end is arranged below the cutting head of a machine tool and whose lower discharge end is paced above and over the upper open end of surge hopper 15. Alternatively, chips from several machine tools will feed into surge hopper 15 and this condition will be assumed.

In normal operation there will be periods of time when a greater weight and volume of chips will flow into surge hopper 15 than can be moved out by the auger 45. During these periods the chips will pile up in the hopper 15 and the weight and volume of the chips together with their interlocking tendency and the tapering configuration of the hopper walls will cause the chips to pack together and become resistant to gravity flow. Once chips begin to hang up the condition quickly worsens since the effect of continuously admitting new chips to the open upper end of the hopper 15 will cause the already clogged chips to pack more tightly together. It is this condition which this invention eliminates.

The first aspect of the invention which contributes to the desired steady state condition is the projections 40–43. The effect of each projection, and all projections taken together, is to relieve the tendency of chips to pack around the auger and form a hollow tube in which the auger rotates but does not move any chips. In other words, each projection supports a column of chips above it, thereby reducing the tendency of the chips in the supported columns from exerting a packing force on chips beneath the level of the projections. A second aspect of the invention is the provision of the projections at different levels. Here, three projections, 40, 42 and 43, are at the same elevation whereas projection 41 is at an elevated position as best seen in FIG. 2. This particular deployment may be very effective when there is a tendency for the chips to pack more densely near the rear wall 35 of the hopper 15. By locating projection 41 a short distance upwardly relative to projections 42 and 43 the tendency of the chips to pack in the rear region can be eliminated since the modulating effect of the projection 41 is deployed at a time when the packing force of the column of chips above it has not become too pronounced.

A third aspect of the invention is the operation of the conveyor in a specific cycle which tends to iron out incipient tendencies for the chips to pack no matter where the projections are placed. In one embodiment having chips from lathes and which were generally 3–4 inches long (with some longer and some shorter) and having approximately a 5 to 1 reduction, the following cycle very effectively caused a steady, uniform stream of chips to be discharged through open bottom 38 of a 10'×7' hopper 15 without the development of any hang-ups:

1. One rotation clockwise (towards processing conveyor 17)—about 10 seconds
2. No rotation—ten minutes
3. Two rotations—counter clockwise about 20 seconds
4. No rotation—ten minutes
5. Repeat 1–4.

It will be understood however that the operating principle is the correlation of the frequency of rotation, and its direction and duration of rotation, with the physical parameters of the system; i.e.: the volume and configuration of the surge hopper 15 and the interlocking tendency of the specific chips being handled.

It will be understood that parameters which apply to all chip generation operations cannot be set out because of the very wide differences in each of the above described components of the system which exist in industry. Accordingly, it is intended that the above description be taken as a representation of the invention in a broad sense along with a description of a specific embodiment, and that the scope of the invention not be limited by the foregoing description but rather solely by the appended claims when interpreted in view of the relevant prior art.

What is claimed is:

1. In a method of continuously conveying machine tool chips by moving all of said chips along a single entry to a single exit path of movement from an entry in a collecting zone to a single exit at a discharge area without sorting or separating said chips into separate streams, the steps of feeding chips into an elevated collecting zone having a discharge area smaller than its entry area, arresting the gravity induced downward passage of at least a portion of said chips while all of said chips move along a single defined path of movement toward the discharge area by engagement of chips, firstly, with rigid projection means disposed above the discharge area and, second, with auger means which are located between the projection means and the discharge area, and intermittently applying auger means induced forces to all of said chips as the chips move in a single stream from the entry area of the collecting zone to the discharge area downstream from the auger means.

2. Apparatus for providing a steady state stream of machine tool chips exiting from a chip collecting zone, said apparatus including a defined chip collecting zone having an upper entry area of a greater size than a lower discharge area, auger means associated with the lower discharge area and placed in the path along which chips must pass as they move from the entry area to the discharge area, rigid projection means disposed in the chip collecting zone at a vertical level no lower than the auger means, said projection means having a size and strength sufficient to intercept chips as they move from the entry area toward the discharge area, and preclude chips above said projection means from exerting a downwardly directly compacting force on chips in the region below said projection means, at least a portion of the projection means being located at an elevation above the auger means, and the projection means being straight bars of metal attached to the inside walls of the collecting zone which are oriented generally transversely to the axis of the auger means.

3. The apparatus of claim 2 further characterized in that the bars of metal have a cross-section of about a half inch.

4. In a method of continuously processing machine tool chips the steps of feeding chips into an elevated collecting zone having a discharge area smaller than its entry area, arresting the gravity induced downward passage of at least a portion of said chips by the engagement of the chips with (a) rigid projection means disposed above the discharge area and (b) auger means, applying auger means induced forces to the chips as they sink into contact with the auger means to move said contacted chips to and through the discharge area while the downward passage of upstream chips is arrested by the projection means, the auger means induced forces being applied to the chips intermittently in which periods of auger means induced forces on the chips which are created by operation of the auger means are followed by periods of absence of auger means induced forces during which the auger means is not operated, rotating the auger means in opposite directions of rotation during alternate periods of rotation, and correlating the frequency of rotation of the auger means and the length of the periods of rotation of the auger means to the physical configuration of the collecting zone and the interlock tendency of the chips, the length of the period of rotation of the auger means, when the auger means rotates in a direction to move chips toward a takeaway conveyor means fed from the discharge area of the collecting zone, is longer than when the auger means rotates in the opposite direction.

\* \* \* \* \*